United States Patent [19]

Yoshiike et al.

[11] Patent Number: 5,660,471

[45] Date of Patent: *Aug. 26, 1997

[54] TEMPERATURE DISTRIBUTION MEASURING DEVICE AND MEASURING METHOD

[75] Inventors: Nobuyuki Yoshiike, Ikoma; Koji Arita; Katuya Morinaka, both of Osaka; Hiroichi Goto, Kanagawa-ken, all of Japan

[73] Assignee: Matsushita Electric Industrial Co., Ltd., Osaka, Japan

[*] Notice: The term of this patent shall not extend beyond the expiration date of Pat. No. 5,567,052.

[21] Appl. No.: 199,794

[22] Filed: Feb. 22, 1994

[30] Foreign Application Priority Data

Feb. 26, 1993 [JP] Japan ................... 5-037749

[51] Int. Cl.$^6$ ............... G01N 25/00; G01J 5/08; G01J 5/62

[52] U.S. Cl. ............... 374/124; 374/130; 374/45

[58] Field of Search ............... 374/124, 130, 374/137, 45; 250/332, 334, 338.3

[56] References Cited

U.S. PATENT DOCUMENTS

| | | | |
|---|---|---|---|
| 3,786,269 | 1/1974 | Cooper | 250/332 |
| 3,889,117 | 6/1975 | Shaw, Jr. | 250/334 |
| 4,072,863 | 2/1978 | Roundy | 250/332 |
| 4,703,179 | 10/1987 | Motooka | 250/334 |
| 5,008,522 | 4/1991 | Lundin | 250/203.6 |
| 5,075,553 | 12/1991 | Noble et al. | 250/332 |

FOREIGN PATENT DOCUMENTS

| | | | |
|---|---|---|---|
| 0461837 | 12/1991 | European Pat. Off. | 374/124 |
| 0582941 | 2/1994 | European Pat. Off. | |
| 2719918 | 11/1979 | Germany. | |
| 56-21025 | 2/1981 | Japan | 250/334 |
| 57-124981 | 8/1982 | Japan | 374/130 |
| 4-175623 | 6/1992 | Japan | 374/124 |

OTHER PUBLICATIONS

*Patent Abstracts of Japan*, vol. 8, No. 23 (p. 251) Jan. 31, 1984 & JP-A-58 180 918 (Mitsubishi) Oct. 22, 1983.

*Patent Abstracts of Japan*, vol. 13, No. 222, (p. 876) May 24, 1989 & JP-A-01 035 696 (Sogo Keibi Hoshiyou) Feb. 6, 1989.

*Patent Abstracts of Japan*, vol. 11, No. 9, (p. 534) Jan. 10, 1987 & JP-A-61 186 826 (Matsushita Electric) Aug. 20, 1986.

English Abstract of JP 3-231125, published Oct. 15, 1991.

*Primary Examiner*—Diego F. F. Gutierrez
*Attorney, Agent, or Firm*—Beveridge, DeGrandi, Weilacher & Young, L.L.P.

[57] ABSTRACT

A temperature distribution measuring device has a turnable sensor head section 1 in which a plurality of detecting sections are arranged, a shaft 2 to which the sensor head section 1 is mounted so that the array direction of the detecting sections is inclined to the axis of rotation thereof, a rotation driving motor for rotating the shaft 2, control circuit 8 for controlling the direction and speed of rotation of the rotation driving section 3, and an umbrella-shaped chopping member for intermittently blocking incident infrared beams. The device has high spatial resolution and can offer temperature resolution at low cost.

16 Claims, 15 Drawing Sheets

FIG. 1A
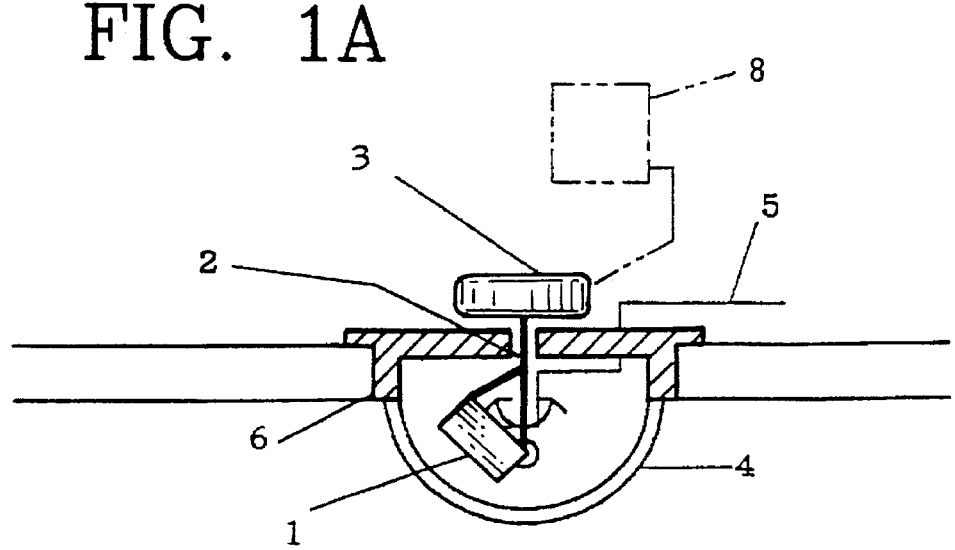
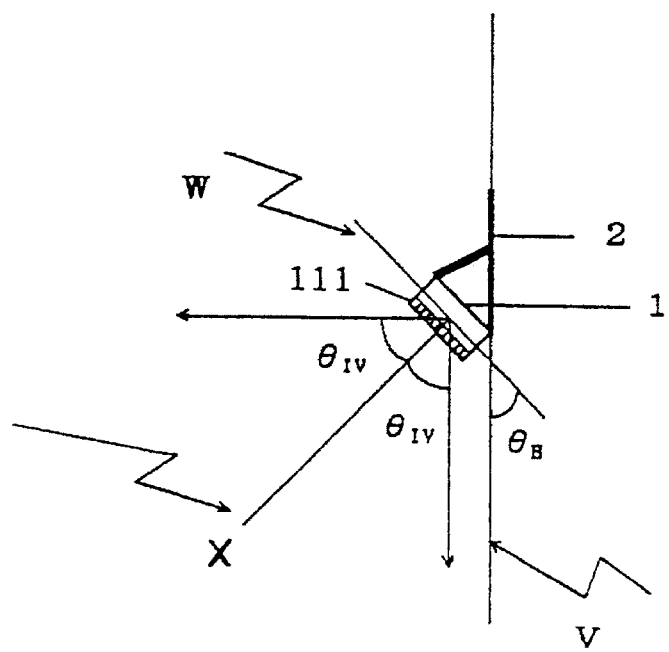
FIG. 1B

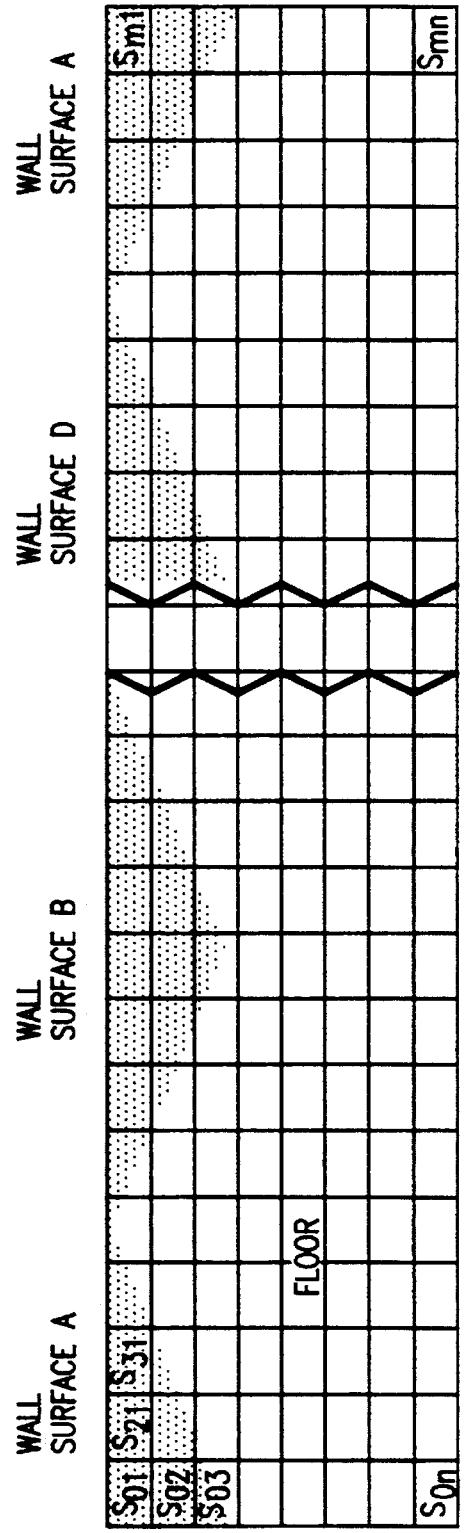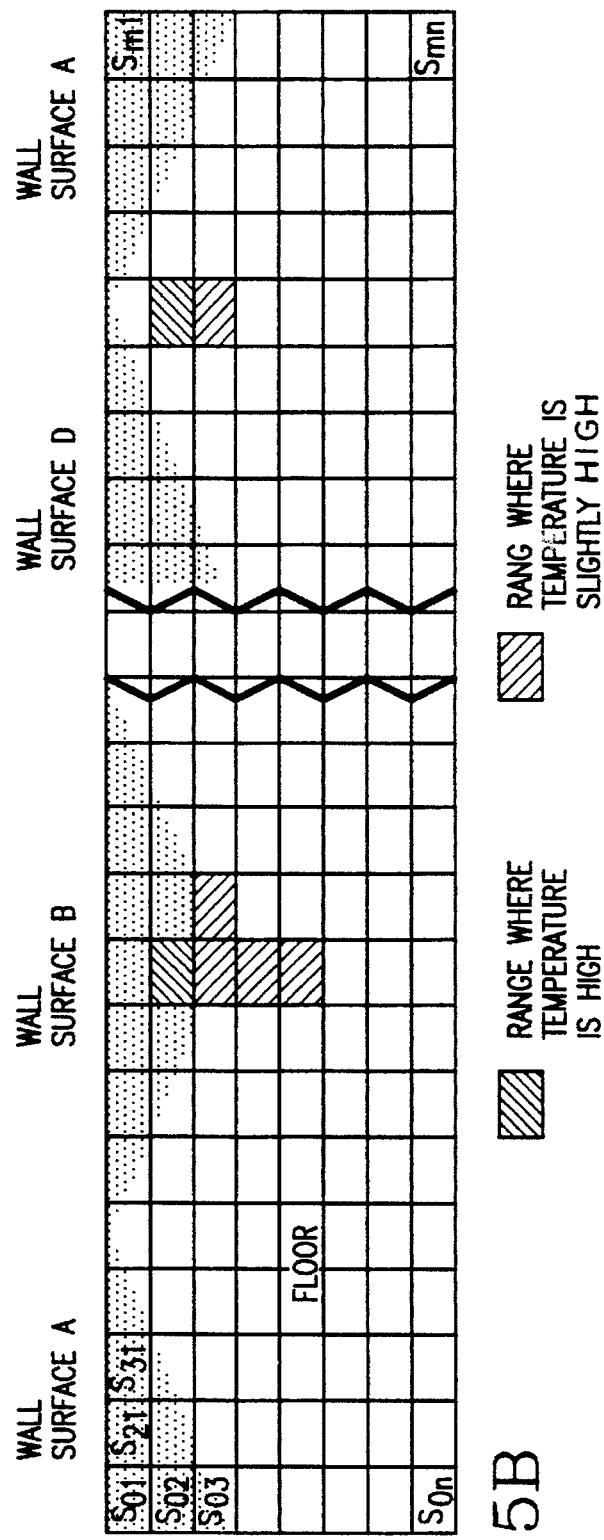
FIG. 5A
FIG. 5B

FIG. 10
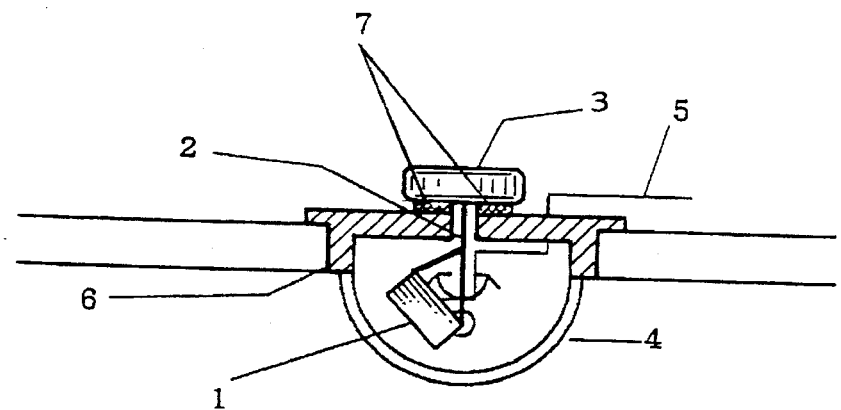
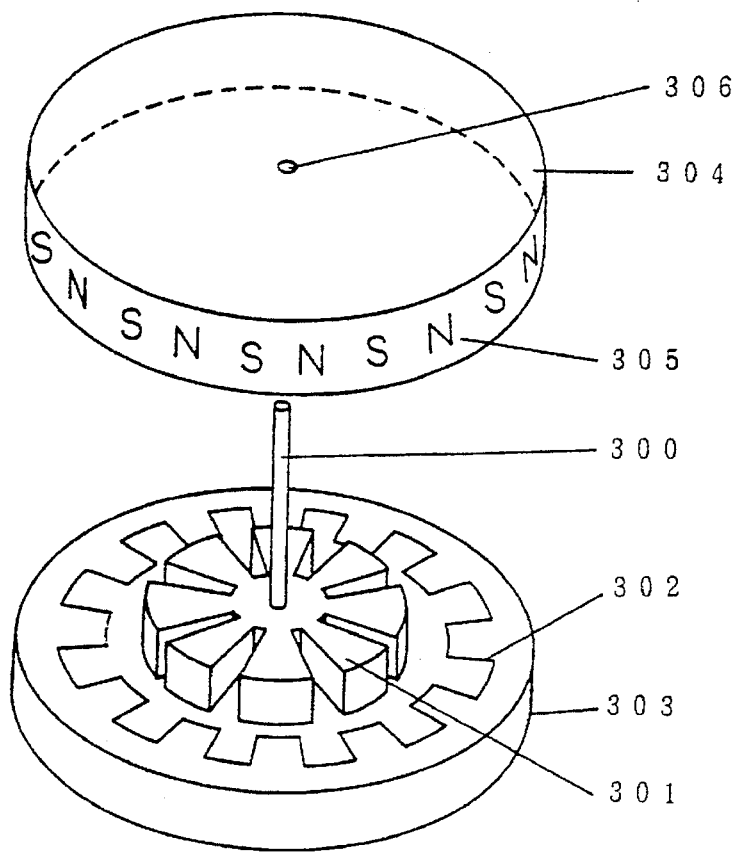
FIG. 11

5,660,471

TEMPERATURE DISTRIBUTION MEASURING DEVICE AND MEASURING METHOD

DESCRIPTION OF THE INVENTION

1. Field of the Invention

The present invention relates to a temperature distribution measuring device and measuring method for measuring a distribution of radiant temperature using an infrared beam sensor of pyroelectric type and others.

2. Related Art of the Invention

The need for measuring a temperature distribution within a room to detect the presence of a person and an amount of activity thereof has been increasing in recent years in the fields of security and air-conditioning.

In the prior art, there is known a method to find a distribution of temperature by using a two dimensional quantum type solid imaging infrared sensor as a device for measuring a temperature distribution in a space, such as a room, by detecting infrared beams.

On the other hand, as a method for finding spatial temperature distribution using a low cost pyroelectric type sensor as the infrared sensor, there is known a method of using a single pyroelectric type sensor to detect input energy in every each direction by mechanically scanning in the vertical and horizontal directions to find the spatial temperature distribution, as described in Japanese Patent Laid-Open Nos. 64/88391, 57/185695, 2/183752 and 2/196932.

However, since the method of using the aforementioned quantum type solid imaging infrared sensor requires cooling of the detecting section, though its temperature measuring accuracy and resolution are high, it is expensive and is not suitable to use for domestic appliances. On the other hand, the method of using the pyroelectric type sensor has a problem in that its spatial resolution and temperature resolution are low due to its complicated mechanism for carrying out the directional scanning and its complicated signal processing.

SUMMARY OF THE INVENTION

Accordingly, it is an object of the present invention to solve the problems of the prior art by providing a low cost temperature distribution measuring device and measuring method having higher spatial resolution and temperature resolution.

A temperature distribution measuring device of the present invention comprises:

infrared beam detecting means comprising a pyroelectric type infrared beam array sensor in which a plurality of detecting sections are arranged in a one dimensional array, rotation driving means for rotating the infrared beam detecting means, and chopping means for intermittently blocking infrared beams incident on the infrared beam detecting means, wherein an arrangement direction of the detecting sections is disposed obliquely to a direction of an axis of rotation of the infrared beam detecting means.

BRIEF DESCRIPTION OF THE DRAWINGS

FIG. 1A is a section view showing a temperature distribution measuring device according to a first embodiment of the present invention and FIG. 1B is a schematic drawing for explaining an angle for mounting a sensor head section;

FIGS. 5A and 5B are charts showing measured results of the temperature distribution measuring device of the first embodiment;

FIG. 10 is a section view of a temperature distribution measuring device of a fourth embodiment of the present invention;

FIG. 11 is a exploded perspective view of a brushless motor of a fifth embodiment of the present invention;

DETAILED DESCRIPTION OF PREFERRED EMBODIMENTS

Figure 2A:
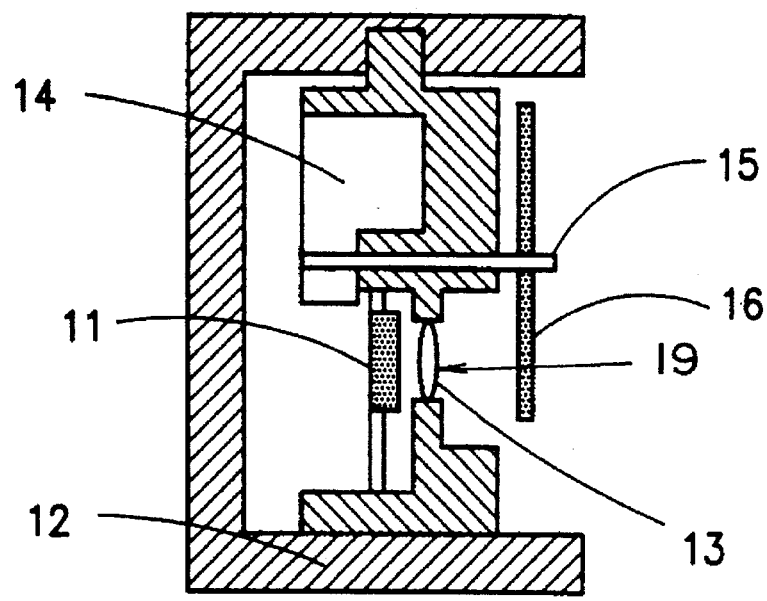
FIG. 2A is a section view of the sensor head section of the first embodiment and FIG. 2B is an outside view showing a chopper thereof.

The present invention will be described with reference to the drawings which show the preferred embodiments thereof.

[First Embodiment]

FIG. 1A is a section view showing a temperature distribution measuring device according to a first embodiment of the present invention. The temperature distribution measuring device is mounted to the ceiling of a room, for example, by a fixture 6. A domed cover 4 for protecting the temperature distribution measuring device is provided therebelow. A sensor head section 1 for detecting infrared beams is attached to a shaft 2 while being inclined by a predetermined angle $\theta_B$ (see FIG. 1B) within the domed cover 4. That is, a plurality of detecting sections 111 in the infrared beam array sensor for detecting infrared beams are arranged in a one-dimensional array in a direction indicated by an arrow W. The axis of rotation of the sensor head section 1 corresponds to the shaft 2 as indicated by an arrow V. The shaft 2 is linked to a rotation driving section 3 (driven for example by a motor) so that it is rotated by the rotation driving section 3, and the rotation driving section 3 is connected to a control means 8 for controlling rotation direction and rotation speed of the rotation driving section 3 by means of a connecting wire or radio waves. Also, a lead wire 5 is connected to the sensor head section 1 to extract detected signals and supply power to the sensor head section 1.

Figure 2B:
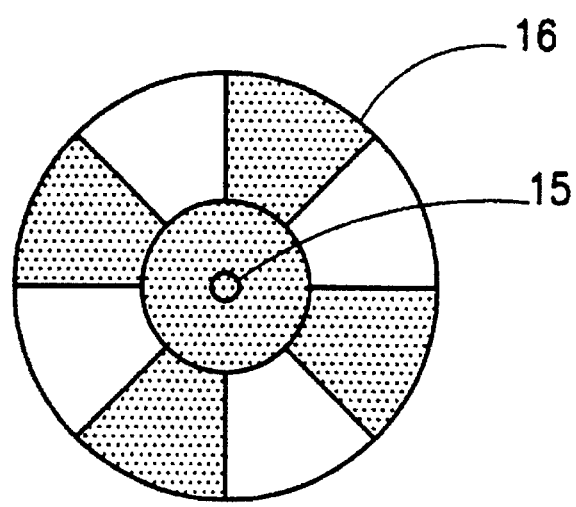

As shown in FIG. 2A, an infrared beam array sensor 11 in which a plurality of pyroelectric type sections 111 (see FIG. 1B) are arranged in a one-dimensional array, an infrared beam lens 13 for converging infrared beams 19 onto the infrared beam array sensor 11, a disc-type chopper 16 for intermittently blocking the incident infrared beam, and a small motor 14 for rotating the disc-type chopper 16 via a shaft 15 are housed in a sensor fixing section 12 which serves as a frame case in the sensor head section 1. Fan-type openings are created at fixed intervals in the disc type chopper 16 as shown in FIG. 2B. Also, a fin may be attached to the chopper 16 to cause a cooling effect by rotary movement.

The mounting angle $\theta_B$ of the sensor head section 1 can measure the whole range without having a dead angle below the sensor by mounting the sensor head section 1 so that a rotation scanning axis of the sensor head section 1, i.e. the inclination angle $\theta_B$ created by the shaft 2 and the infrared beam array sensor 11, meets the condition of the following expression when a measurable angle of view of the infrared beam array sensor 11 in the arrangement direction thereof is $\theta_{IV}$ both upwards and downwards:

$$\theta_B \geq 90 - \theta_{IV},$$

Next, the operation of the aforementioned embodiment will be explained.

When the small motor 14 is driven in a state wherein the arrangement direction of the infrared beam array sensor 11 is set in the vertical direction, the disc-type chopper 16 continuously rotates and the infrared beam incident on the infrared beam lens 13 is intermittently blocked, so that the distribution of radiated heat, i.e. temperature distribution, of vertical columns, in the direction in which the infrared beam lens 13 faces, can be measured. For example, when the disc type chopper 16 is driven at 10 Hz, temperature distribution of vertical columns in one direction can be measured per 1/10 sec. The measurable spatial range depends on the angle of view of the infrared beam lens 13 and the sensor size, and the spatial resolution of the vertical columns depends on the number of electrodes of the infrared beam receiving sections provided in the array sensor. For example, when the measurable angle of view of the infrared beam lens 13 in the arrangement direction is $\theta_{IV}$ and n elements of light receiving sections are provided in the infrared beam array sensor 11, vertical resolution is n and temperature within a range of ($\theta_{IV}/n$) degrees is measured for each light receiving section.

At the same time, the sensor head section 1 is rotated by the rotation driving section 3 to rotationally scan in the direction in which the infrared beam array sensor 11 and infrared beam lens 13 face (indicated by arrow x), while driving the disc type chopper 16 to measure the temperature distribution of the next surface. After measurement, a two-dimensional inversed temperature distribution of the space can be obtained by connecting the vertical temperature distribution in each direction by electrical signal processing. At this time, the direction to which the infrared beam array sensor 11 faces may be automatically calculated from elapsed changes of the rotary scanning by using a Hall element and the like for detecting the position of the sensor head section 1. For example, when a signal is input for every rotation through the angle $(360/(m+1))°$ and when 360° is rotated in total, the spatial resolution in the horizontal direction is represented by (m+1) and the temperature distribution of the ambient space of the whole vertical angle of $2\theta_{IV}°$ seen from the sensor position may be measured at intervals of several seconds with a resolution of n×(m+1).

After measuring the final facing surface, the rotation driving section 3 is reverse-rotated by the control means 8 to return to the initial facing direction to create a stand-by state for the next measurement. The rotating operation of the rotation driving section 3 may be carried out in a stepwise manner or continuous linear manner. Signal processing of detected signals may be carried out, for example, by a CPU by selecting the signal from each infrared sensor element by a multiplexer after multiplying them and then converting the signal of the selected element by means of an A-D converter.

Figure 3A:
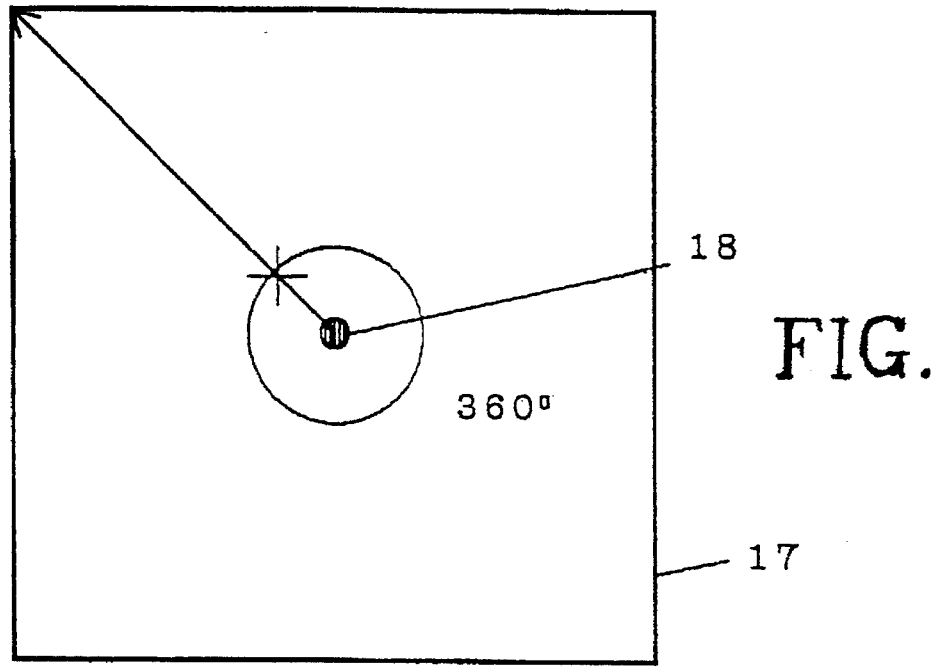
FIGS. 3A and 3B shows plan and side views respectively, for explaining a mounting state of the temperature distribution measuring device of the first embodiment.
Figure 3B:
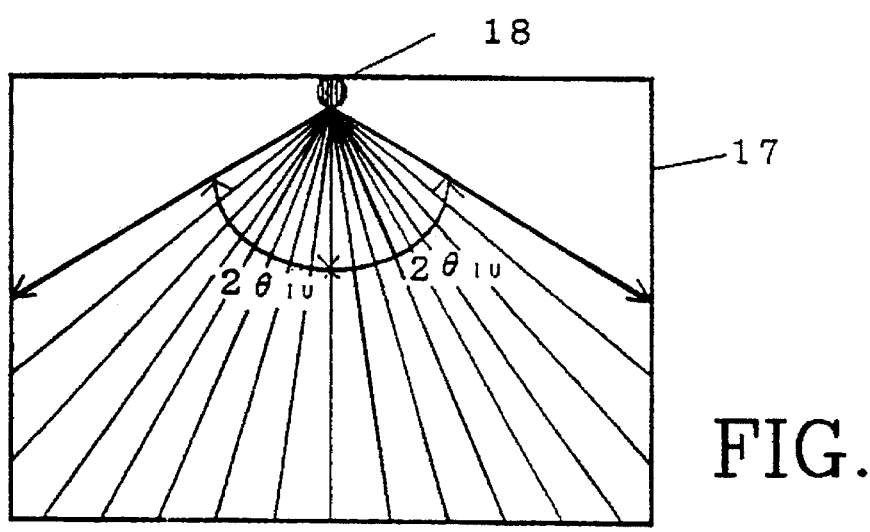
Figure 4:
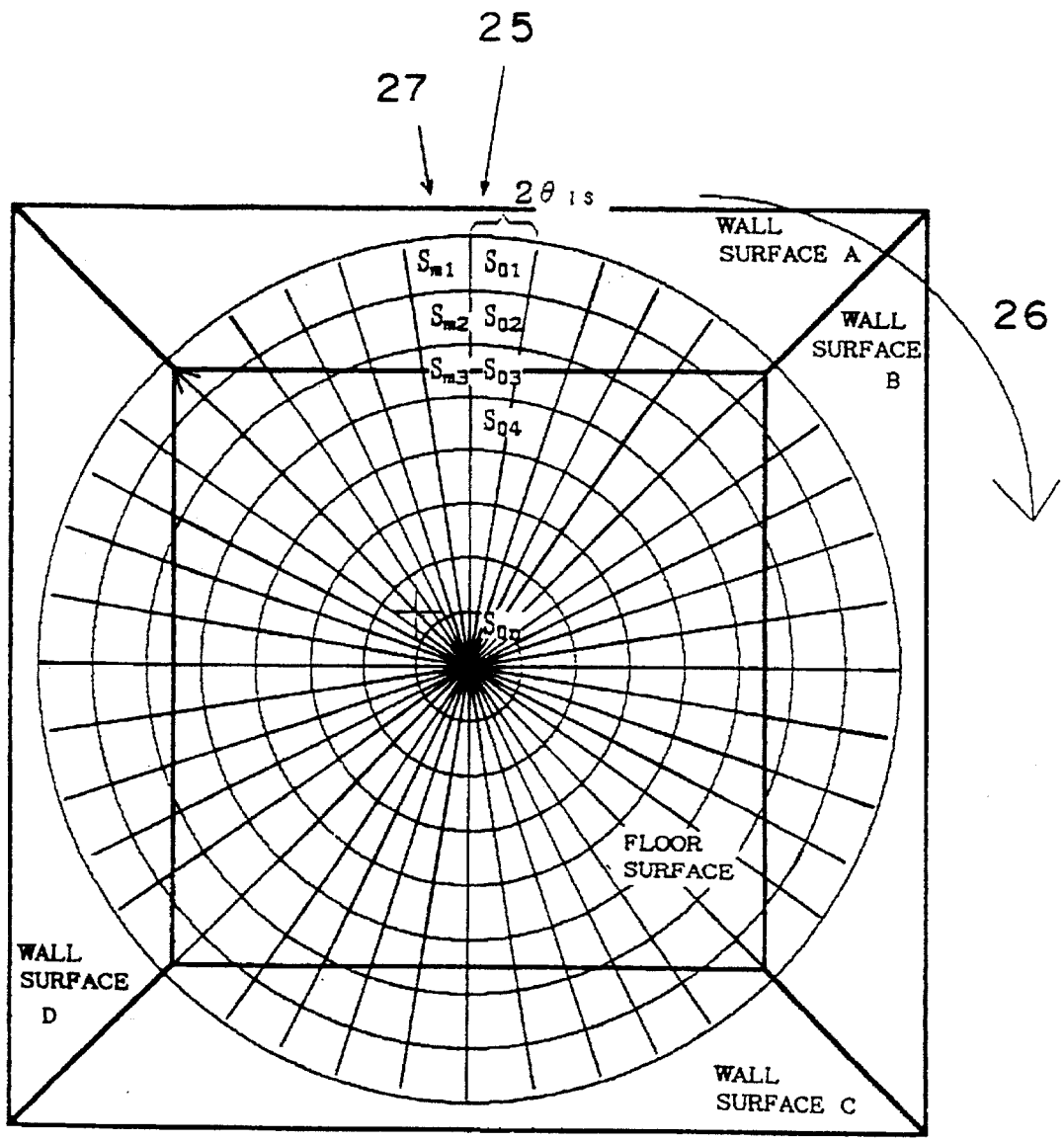
FIG. 4 is a diagram for explaining a measuring state of the temperature distribution measuring device of the first embodiment.

FIGS. 3A, 3B and 4 show a measurement example wherein a sensor unit (temperature distribution measuring device) 18 is mounted at the center of the ceiling of a room 17 to detect the entire room by rotating through 360°. When the measurable angle of view of the sensor is $2\theta_{IV}°$ in the front and rear and the number of sensor light receiving section is n, an address of the first data from measurement starting position 25 is set as $S_{01}, S_{02}, ---, S_{0n}$ for example and the data is saved per each step. Then it is rotated by $2\theta_{IS}$ to scan and to carry out the next measurement. When a similar scan is forward-rotated by m times in a measuring direction shown by arrow 26, an address of data at that time is $S_{m1}, S_{m2}, ---, S_{mn}$.

Next, after finishing the measurement of the final facing direction (i.e., at the measurement ending position 27) (the m-th measurement), the motor driving direction signal of the rotation driving section 3 is turned to backward by signal a from the CPU to reversely rotate the motor by 360° until it returns to the initial facing direction to enter a standby state for the next measurement. The reverse rotation speed is preferably as fast as possible. The spatial temperature distribution can be measurement-processed with a resolution of n×(M+1) by sending the measured data to the CPU and processing it as a matrix of;

$$S_{01}, S_{02}, ---, S_{0n}$$
$$S_{11}, S_{12}, ---, S_{1n}$$
$$---$$
$$S_{m1}, S_{m2}, ---, S_{mn}.$$

FIGS. 5A and 5B show the result of the measurement described above. FIG. 5A shows a case where no people are in the room. Hatched portions in the upper portion of the figure (for example portions such as $S_{01}$ and $S_{02}$) show portions that correspond to the observable wall surface in FIG. 4. When a person is standing in front of wall surface B and a person is sitting in the corner of wall surfaces D and A, the measurement results shown in FIG. 5B can be obtained and the people in the room can be detected accurately. The temperature distribution of the range of the entire periphery seen from the position where the sensor is mounted can be measured with this method.

By the way, it is possible to measure across the entire range of 360° if the whole rotation angle $\theta_s$ of the sensor head meets the condition of the following expression when the measurable angle of view in the rotational scanning direction of the infrared beam array sensor 11 is $\theta_{IS}$ to the right and left;

$$\theta_s \geq 360 - 2 \times \theta_{IS}.$$

[Second Embodiment]

Figure 6:
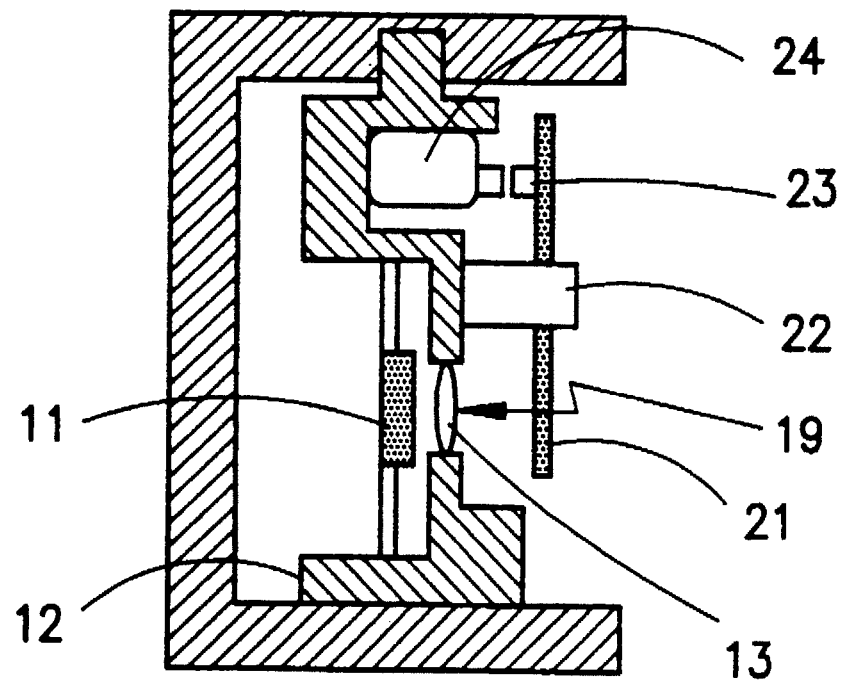
FIG. 6 is a section view of one example of a sensor head section of a second embodiment of the present invention.

While the disc rotary type chopper 16 has been used for the sensor head section 1 in the first embodiment, it is possible to use a pendulum chopper 21 to intermittently block infrared beams. In FIG. 6, the reference numeral (22)

denotes a guide pin for the pendulum and (23) and (24) respectively denote a permanent magnet and small solenoid for driving the pendulum chopper 21.

Figure 7A:
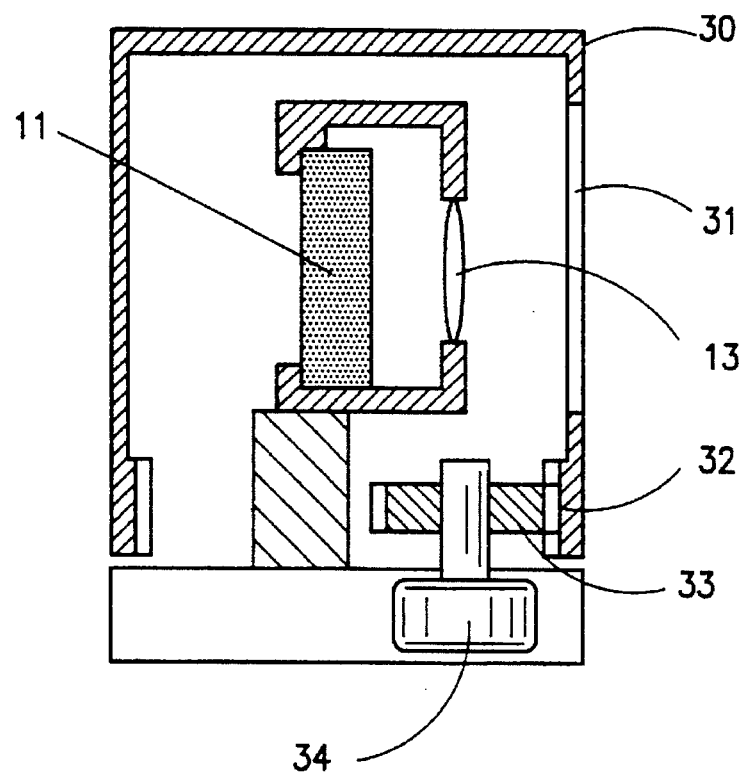
FIG. 7A is a section view of the sensor head section of the second embodiment and FIG. 7B is an outside view showing a chopper thereof.
Figure 7B:
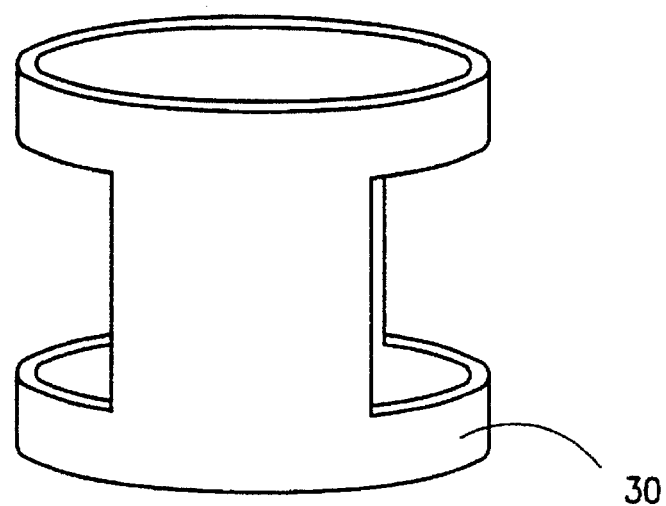

A similar result could be obtained by using a cylindrical chopper 30 having open sections as shown in FIGS. 7A and 7B obtained by modifying the aforementioned pendulum chopper mechanism. In FIG. 7A, the reference numeral (31) denotes a chopper window section, (32) an internal inscribed gear section for rotating the chopper, (33) a transmission for the chopper and (34) a chopper driving section for rotating the chopper 30. Incidentally, the arrangement for transmitting the power of the rotation driving section 3 shown in FIG. 1A also may be used for driving the cylindrical rotary chopper 30.

Figure 8:
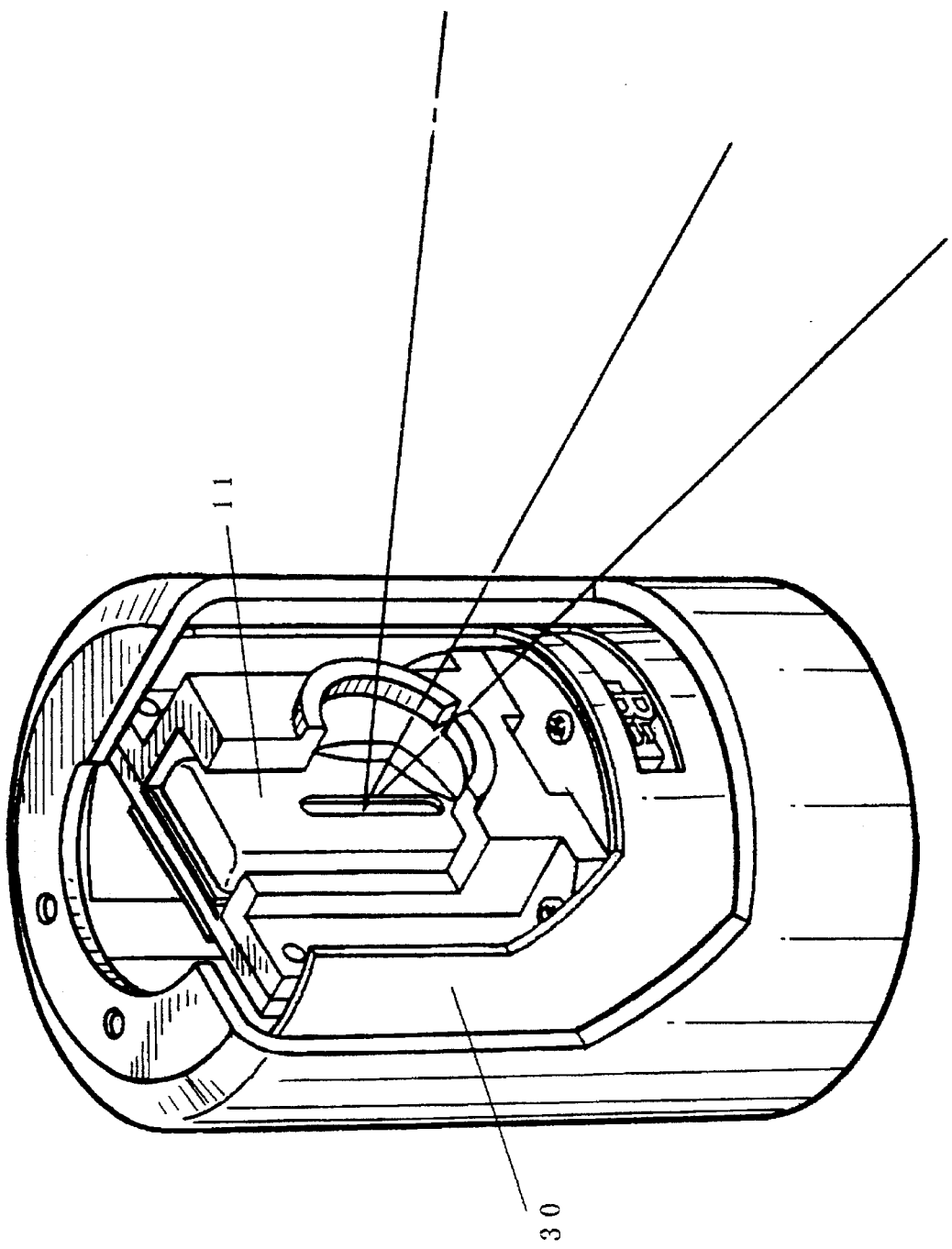
FIG. 8 is a perspective view of a head section having a similar structure to the sensor head section of the embodiment shown in FIG. 7.

FIG. 8 is a partially cutaway perspective view of a measuring device having a similar structure to the temperature distribution measuring device in FIG. 7 and shows its overall structure.

[Third Embodiment]

Figure 9A:
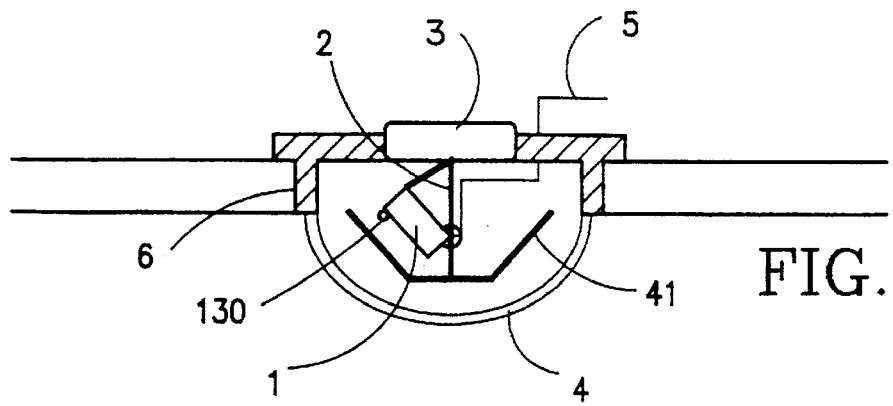
FIG. 9A is a section view of a temperature distribution measuring device of a third embodiment.
Figure 9B:
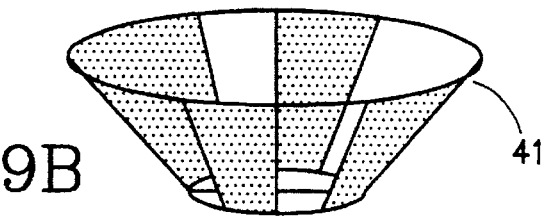
FIG. 9B is an out-side perspective view showing a chopper thereof.
Figure 9C:
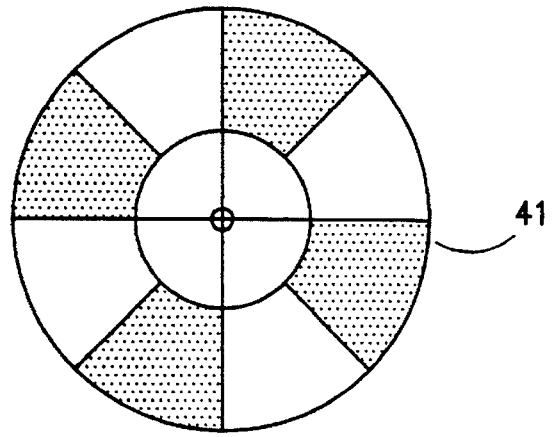
FIG. 9C is a top plan view of the chopper shown in FIG. 9B.
Figure 9D:
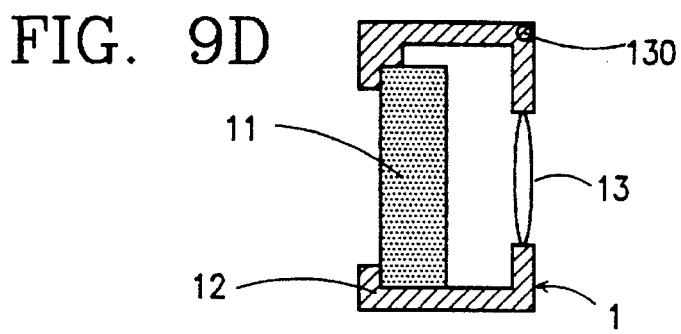
FIG. 9D is a section view showing a sensor head thereof.

FIG. 9A is a section view of a temperature distribution measuring device of a third embodiment of the present invention. In FIG. 9A, differing from those in the aforementioned first and second embodiments, a chopper 41 is constructed so that it is separated and independent from the sensor head section 1. That is, the sensor head section 1 is compactly constructed of the infrared beam array sensor 11, the infrared beam lens 13 and the sensor fixing section 12, as shown in FIG. 9D. The sensor head section 1 also includes a photocoupler 130, whose purpose will be explained below. The sensor head section 1 is rotated to scan by the rotation driving section 3 via the shaft 2. Here the shaft 2 driving section 3 via the shaft 2. Here the shaft 2 has two kinds of rotating functions and has an inner and outer double concentric structure of two axes for rotating the sensor head section 1 and the chopper 41 with different speeds of rotation. Therefore, the rotational axis of the sensor head section and the rotational axis of the chopper substantially coincide. The chopper 41 is formed in an umbrella shape so that rotating blade portions are substantially parallel to the facing direction of the sensor head section 1 and openings (for example in four places every 45°) are provided in parts thereof. Differing from the cases of the first and second embodiments, measurement by means of the sensor head section 1 is carried out so that forward rotation speed is the same as when rotated in reverse after forward rotation.

The same measurement result can be obtained when measurement is carried out by using the temperature distribution measuring device constructed as described above, by rotating the sensor head section 1 by 360° in three seconds in the same manner as in the first embodiment and by rotating the chopper 41 at 10 Hz. A continuous measurement could be carried out without twisting the lead wire 5 by stopping rotation after rotating 360° and then measuring from the reverse direction while rotating in the reverse direction.

Reverse processing is necessary in the signal processing during the reverse rotation because the measured data is a mirror reverse image of the measured data in the forward direction. The reverse rotation operation of the rotation driving section 3 may be effectively utilized. Here, the rotation direction of the chopper 41 need not be specifically matched to that of the sensor head section 1.

Further, because the signal of the sensor head section 1 may be extracted indirectly by adopting a structure wherein the detected signal and sensor driving power are supplied using a slip ring by brush contact in the rotating section of the shaft 2, it is possible to measure continuously in one-way rotation without twisting the lead wire. Thus, one which rotates in one fixed direction continuously rather than rotating in reverse may be used.

[Fourth Embodiment]

FIG. 10 is a section view of a temperature distribution measuring device of a fourth embodiment of the present invention. In the figure, the sensor head section 1 is attached to the shaft 2 for rotating the sensor head section 1 by inclining it at a predetermined angle. The shaft 2 is secured to the rotation driving section 3 to allow rotating operation thereof. The reference numeral (4) denotes a domed cover for protecting the sensor, (5) a lead wire for processing the sensor signal and (6) a fixture for the sensor unit. Because a vibration isolating cushioning material 7 is provided between the rotation driving section 3 and the sensor fixture 6 in the fourth embodiment, sensor output noise generated by vibration in the ceiling or the like can be reduced.

Further, noise due to vibration caused by the rotation driving section 3 can be reduced by using a belt as a transmission mechanism between the rotation driving section 3 and the shaft 2 for rotating the sensor head section 1.

[Fifth Embodiment]

FIG. 11 is a exploded perspective view of a brushless motor in an embodiment in which the brushless motor is used as the motor of the rotation driving section 3 of the present invention.

A plurality of electromagnetic coils 301 are arrayed in a concentric manner on a disc-shaped substrate 303 and frequency generator (FG) pattern wires 302 are formed in a zig-zag pattern therearound. An axis 300 protrudes from the center thereof. On the other hand, permanent magnets 305 are arranged inside the flange of a motor cover 304. A hole 306 for inserting the axis 300 is formed therein.

When a current is circulated through the electromagnetic coils 301 in a predetermined order in such a brushless motor, the permanent magnets 305 are rotated by being repulsed or attracted. At that time, because a magnetic field generated by the permanent magnets 305 crosses the FG pattern wires 302, a current flows. The speed of the motor is then controlled by using this induced current. As a result, dispersion in each measuring direction may be reduced. Further, by using the induced current, the state of rotation of the infrared beam detecting section and of the chopping section can be known. Accordingly, the timing of the signal processing may be automatically set without using photosensors or the like. Further, the brushless motor may contain a control circuit. By means thereof, the number of lead wires may be reduced, allowing down-sizing of the device.

Further, it is needless to say that the use of the brushless motor allows the electromagnetic noise to be reduced and improves sensor sensitivity as compared to a motor having a brush.

[Sixth Embodiment]

Figure 12:
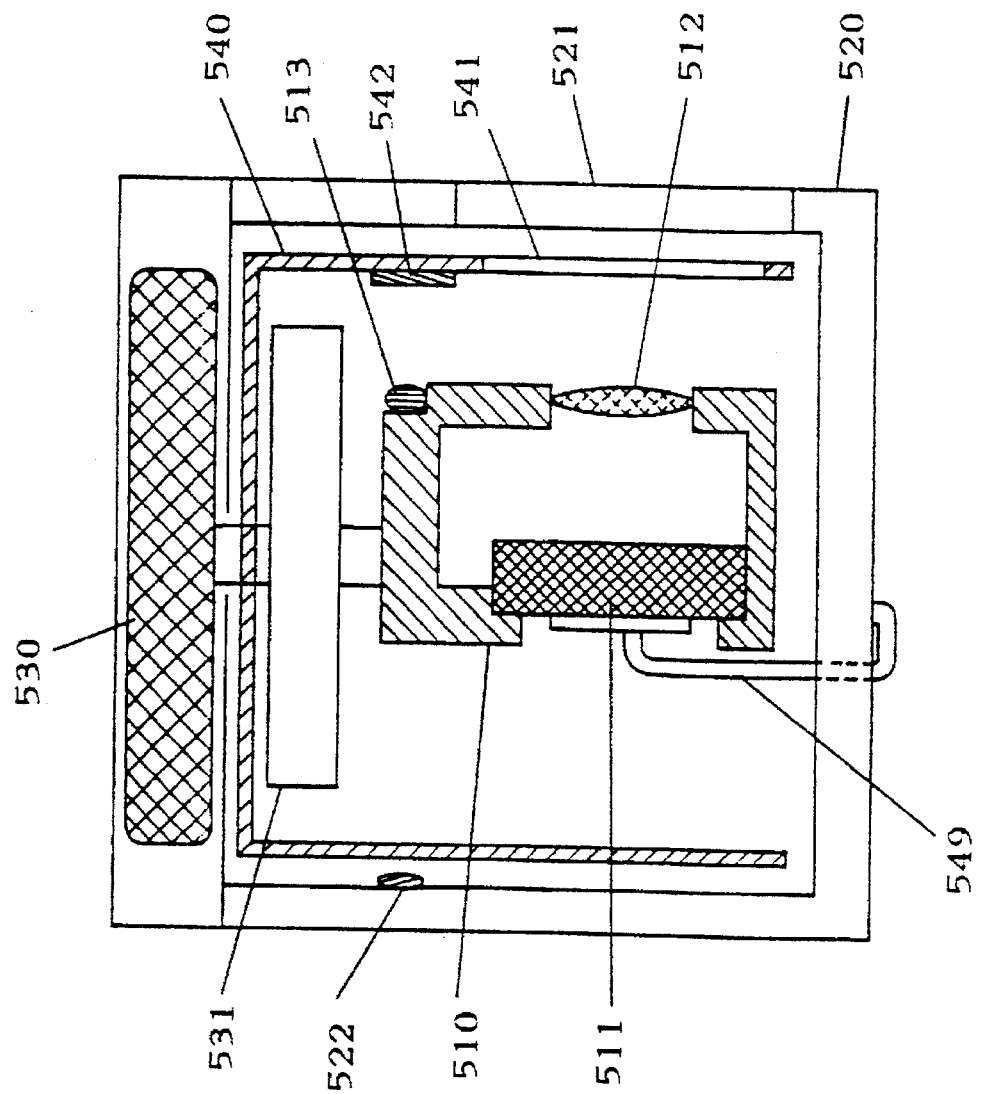
FIG. 12 is a section view for explaining another embodiment of the present invention.

Referring now to FIG. 12, chopping timings will be explained.

Figure 13:
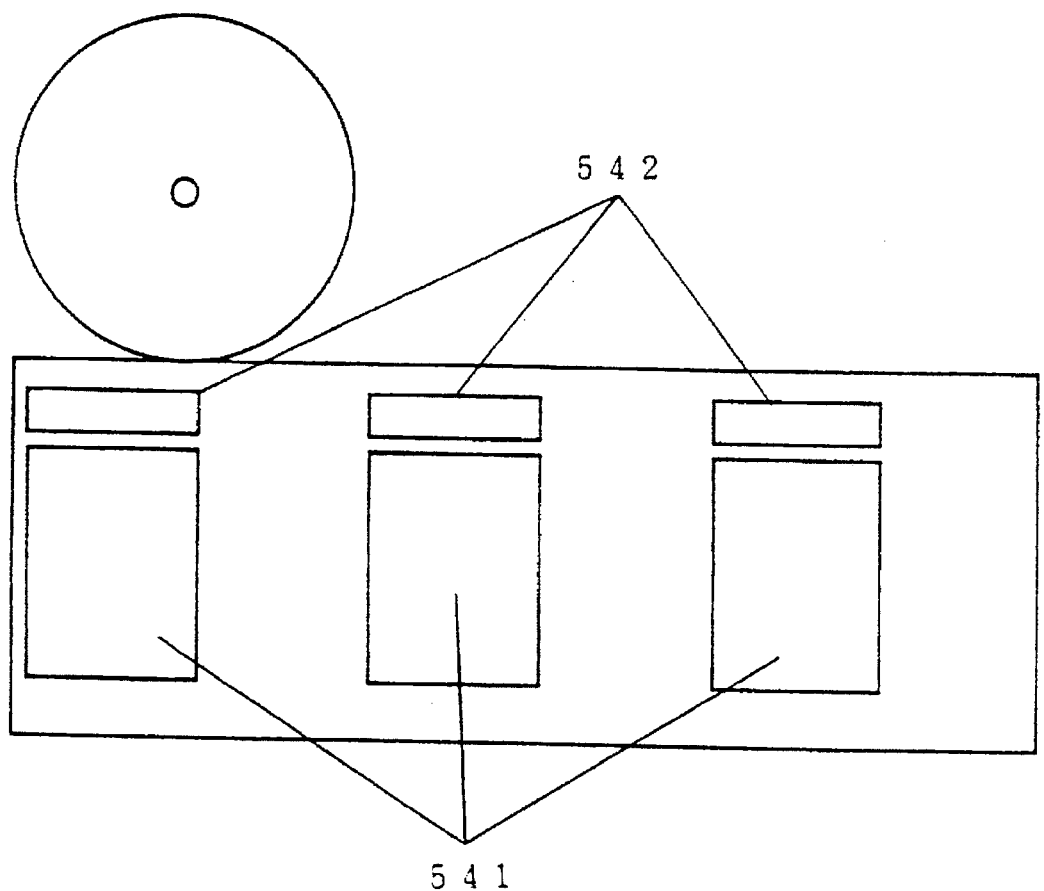
FIG. 13 is a developed view of a chopper of the embodiment shown in FIG. 12.
Figures 14A, 14B, 14C:
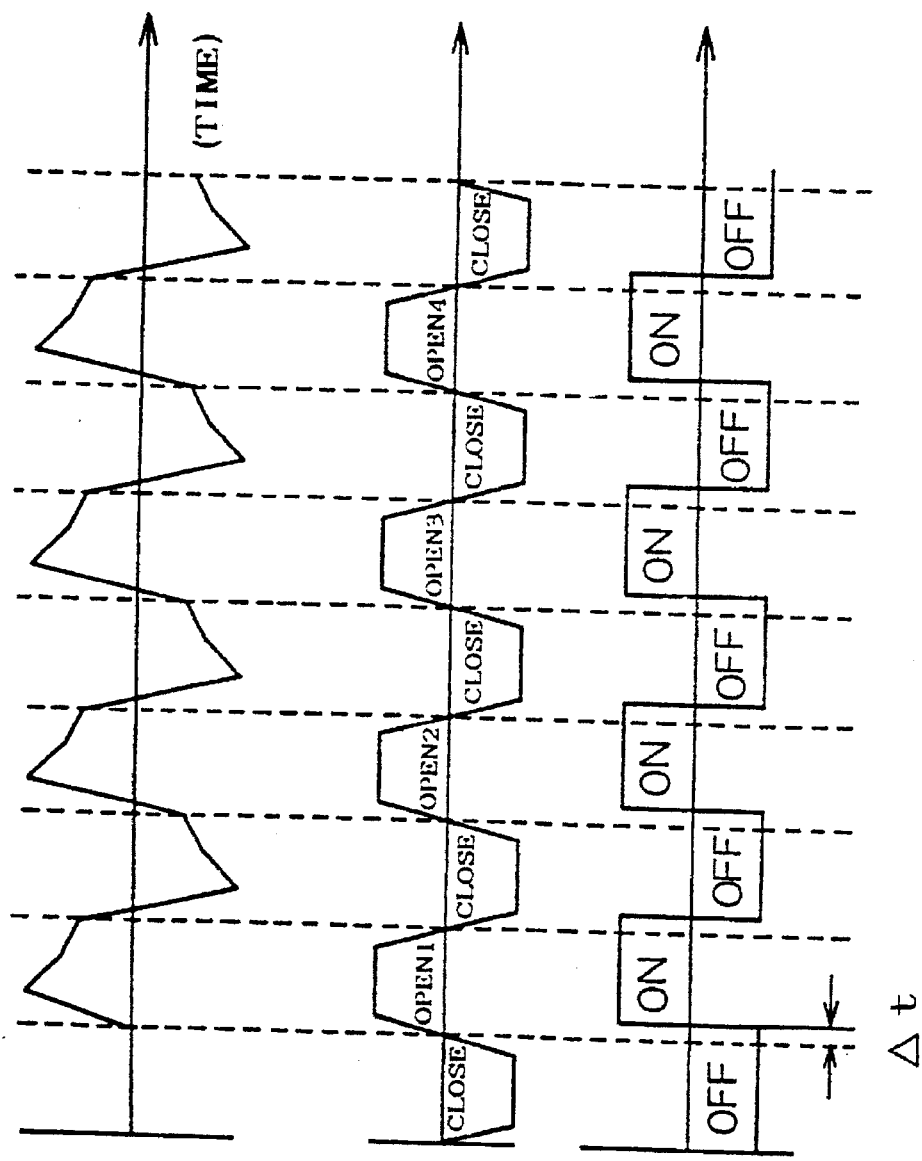
FIGS. 14A, 14B and 14C are graphs showing chopping timing and other characteristics of the embodiment shown in FIG. 12.

In FIG. 12, a support 520 is provided in one body with a motor (rotation activating section) 530. The support 520 is provided with a support window section 521. The reference numeral 513 denotes a photocoupler provided in an infrared beam detecting section (sensor rotating section) 510 and 542 denotes a light reflecting plate provided on the inner wall of a cylindrical chopper 540. The sensor rotating section 510 also includes a lens 512, while the cylindrical chopper 540 has window sections 541 formed therein. Further, a light receiving element 522 is provided on the inner wall of the support 520. The photocoupler 513 alone or along with the light reflecting plate 542 comprise a positioning means. The light receiving element provides a rotational position detecting means. FIG. 13 is a developed view of the cylindrical chopper 540. Outputs of the sensor appear as shown in FIG. 14A by rotating the infrared beam detecting section 510 and chopper 540 continuously by means of the motor 530. FIGS. 14A–14C show relationships among measured time, for changes of state of the chopper (FIG. 14B), signals of the photocoupler (FIG. 14C) and output signals of one of the elements of the infrared beam sensor 511 (FIG. 14C).

In the figure, it is assumed that the chopper is started from a closed state, setting the direction at the start of measurement as zero degrees. The number of teeth of the gears of a transmission 531 (i.e., a change gear) is determined so that the close and open chopping operations are brought about once in a 3° angle of rotation of the infrared beam detecting section 510.

A start time for sampling output signals of the infrared beam array sensor is controlled using a signal detected by the photocoupler. However, the signal of the photocoupler and the output signal of the infrared beam sensor need not coincide completely, and signals may be introduced into the CPU by setting the CPU as if they are synchronized by having a fixed shift (for example $\Delta_t$ in the FIG. 14). In the case of the figure, the output of the infrared beam sensor can be accurately detected by introducing the signal from the infrared array by continually delaying it by delta t from the signal from the photocoupler.

Now one example of a method for calculating a measurement temperature using an A/D converted digital signal will be explained.

Firstly, memory data after A/D conversion of the sensor light receiving sections (here assume that there are from 1 channel (CH) to n channel) of the infrared beam array sensor is cleared. Then data from 1 CH to n CH is sequentially introduced and A/D converted at a fixed sampling rate by a multiplexer after delta t from the signal from the photocoupler which corresponds to the sensor input state. A value after conversion (for example i-th data Si) is added to one previous integrated value for each channel to obtain a value of [S total=S total+Si]. Next, the aforementioned operation is repeated a predetermined sampling number of times (i.e. setting time) to obtain a value of each CH in one open state of the chopper. One-dimensional temperature distribution may be accurately evaluated by previously finding a calibration curve between a temperature of an object to be measured having a known temperature and integrated values in the setting time described above. Therefore, sampling of output signals of the infrared beam array sensor is started by a signal detected from the photocoupler, the values of these output signals at fixed time intervals are sequentially added, and a measured temperature is obtained from the added values of the output signals. The number of times of sampling may be arbitrarily set without accumulating for the whole range in the period until the chopper reaches a closed state. Meanwhile the measured temperature can be obtained also from a peak value of the sampled signals. For example a sample holding circuit can be used. The feature of the present embodiment is that it is effective when a large amount of noise is carried in the sensor output signal, that It is not necessary to worry whether erroneous evaluation is apt to be caused by the maximum value of noise, and that it is barely affected by high frequency noise.

Incidentally, although the integrating arithmetic operation has been executed before executing the next data sampling after A/D conversion in the aforementioned example, because the sampling period may be delayed in such a case, faster sampling may be achieved by introducing the entire data within a time needed to store once in the memory section and then by performing the arithmetic processing as a whole at the end.

Figure 15B:
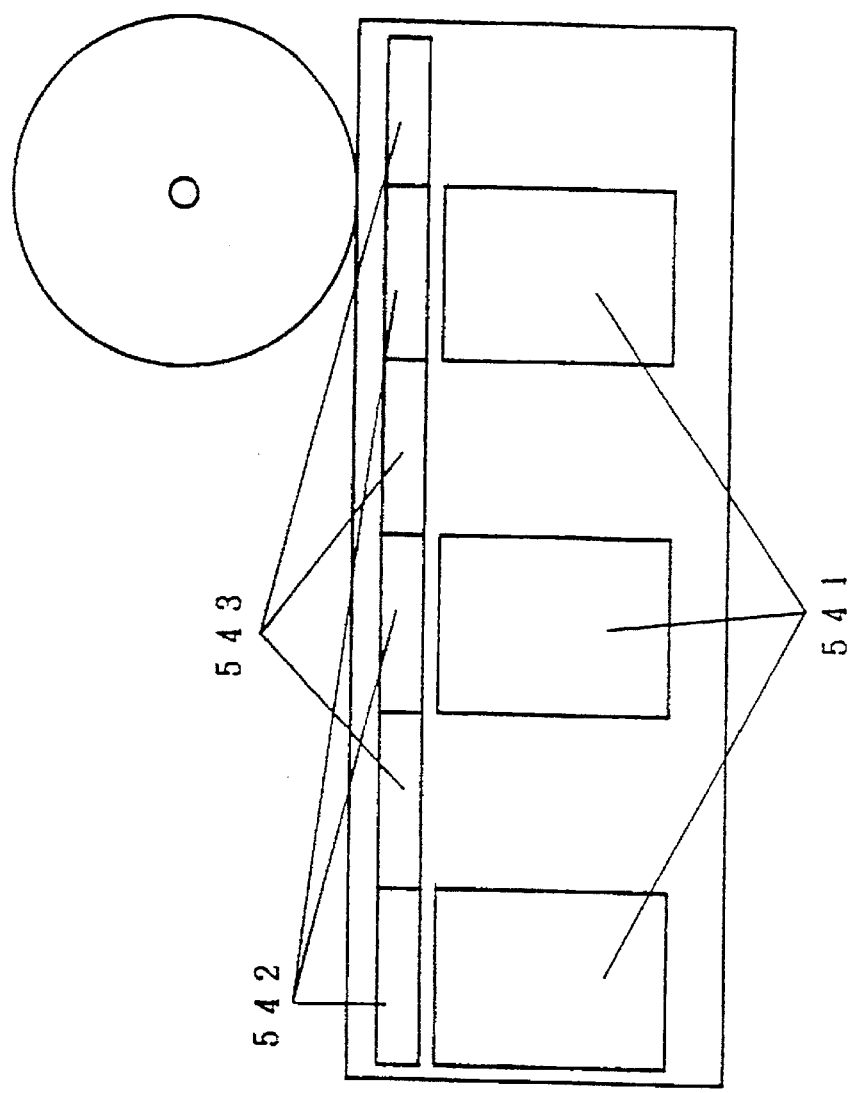
FIGS. 15A and 15B are drawings showing another aspect of the chopper of the embodiment shown in FIG. 12.
Figure 15A:
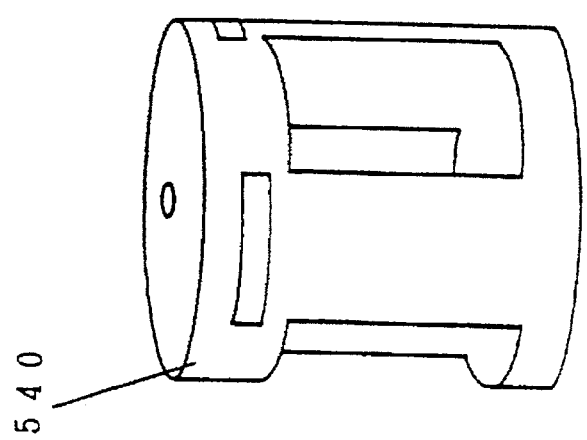

Further, as shown in FIGS. 15A and 15B, an emission from the light emitting element of the photocoupler 513 may be received by the light receiving element 522 provided in the support 520 through stopper window sections 543 by providing the window sections 543 on the chopper 540. That is, the light receiving element 522 provided at the rotation start and end positions allows control of the start and end positions of the rotation of the sensor by receiving an emission from the light emitting element of the approaching photocoupler 513 due to the rotation of the infrared beam detecting section 510.

When the infrared beam detecting section 510 rotates forward and the photocoupler 513 reaches the end position, the motor 30 is stopped and rotated in reverse by receiving the signal of the light receiving element 522 provided at this position. The reverse rotation is stopped at the position where the sensor faces the initial facing direction by the signal of the other light receiving element 522. At this time, the chopper 540 also rotates in the reverse direction as a matter of course.

Incidentally, either one of the forward rotation or rearward rotation (reverse rotation) may be controlled by using the signal of the light receiving element 522. The chopper may be stopped for driven continuously when rotated reversely. Furthermore, only the infrared beam detecting section 510 may be rotated reversely when using another gear system by switching gears.

Further, as another embodiment, the total angle of rotation of the infrared beam detecting section 510 may be controlled by using the signal of the photocoupler 513. That is, because the signal of the photocoupler 513 corresponds to a predetermined angle of rotation of the sensor, rotation may be stopped or reversed when the number of signals of the photocoupler 513 reaches a certain number. For example, if the chopper acts once every time the infrared beam detecting section rotates 3° as in the aforementioned embodiment, a direction of 120 could be sensed by stopping the rotation activating section 530 when the number of signals from the photocoupler reaches 40.

Incidentally, a photocoupler 130 for detecting a chopping state may be provided on the sensor head section 1 in the embodiment shown in FIG. 9A. FIG. 9B shows a perspective view and FIG. 9C shows a plan view of an umbrella type chopper 41. FIG. 9D is a section view showing the infrared beam detecting section and others.

In FIG. 12, a chopper 540 having a chopper window section 541 for intermittently blocking infrared beam input to the lens 512 is provided in front of the lens. A reflecting plate 542 for reflecting emitted light of the photocoupler 513 is provided in the chopper 540.

The chopper 540 and the sensor rotating section 510 are connected to the rotation activating section 530 mechanically via the shaft and are rotated respectively with different speeds of rotation by a transmission 531.

Temperature distribution can be measured similarly to the first embodiment by using the mechanism as constructed above.

Hall element and electrical contact signals by means of mechanical contact may be used instead of the photocoupler as a means for detecting chopping beside the aforementioned embodiment. A disc type chopper may be used for the chopper.

[Seventh Embodiment]

Figure 16:
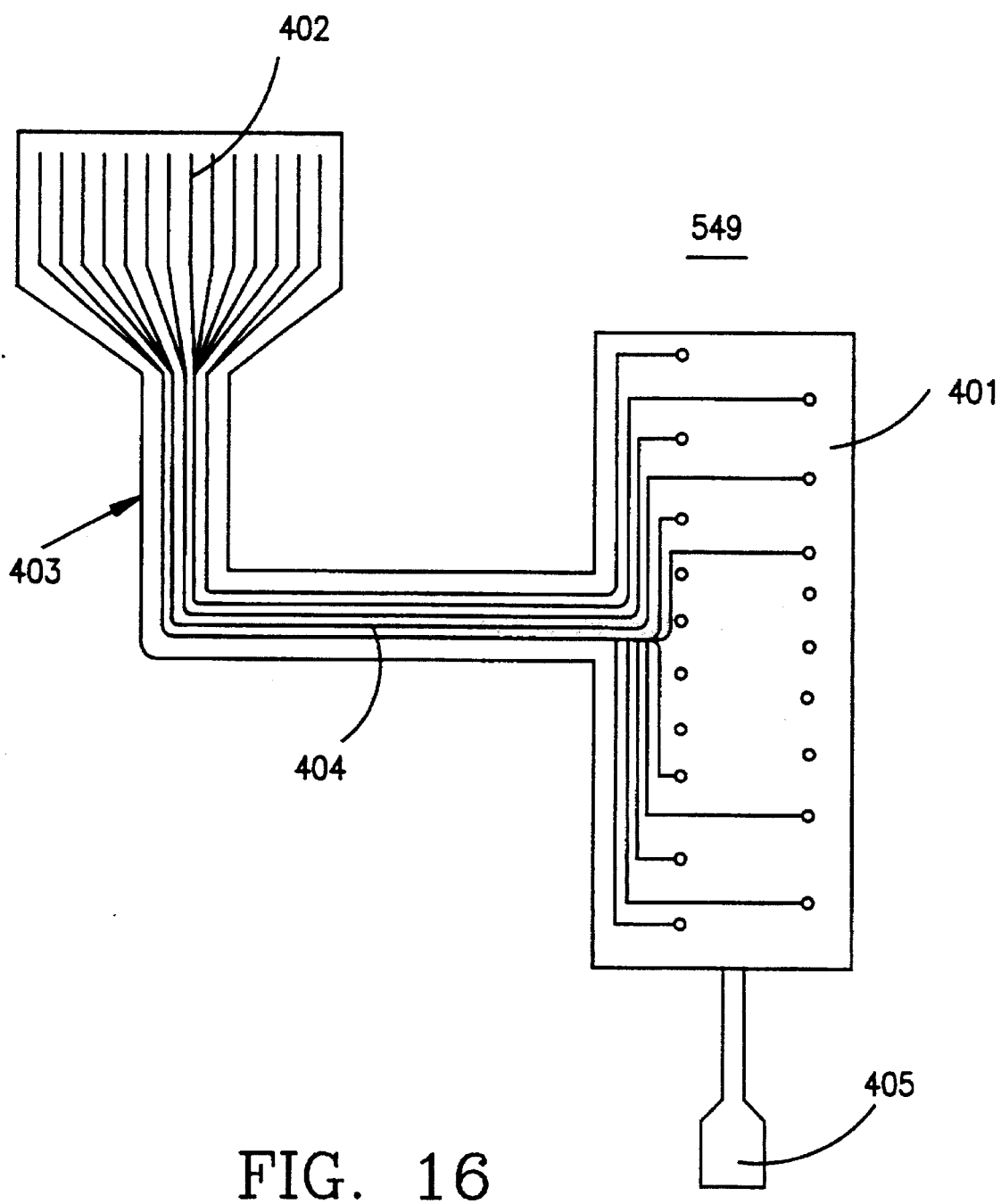
FIG. 16 is a plan view of a lead wire of one embodiment of the present invention.

As shown in FIG. 12, a lead wire 549 for extracting signals generated by the infrared beam sensor 511 is provided. The lead wire 549 takes a shape as shown in FIG. 16 in a state when it is connected nowhere and no power is applied thereon. That is, one end 401 to be connected to the infrared beam sensor 511 is rectangular and the other end 402 to be connected to the support 520 is pentagonal. An intermediate connecting section 403 which connects both ends is bent at a right angle at the center. A substrate on which signal lines 404 are wired is made from a flexible material such as a plastic thin plate.

In a state when it is connected as shown in FIG. 12, the intermediate connecting section 403 which extends out from the side of one end 401 is immediately bent at a substantially right angle based on the direction of axis of rotation of the infrared beam sensor 511, is turned downward through the bent section while being more or less twisted, led toward the outside through a hole (not shown) provided on the support 520, and is bent there at a right angle. The other end 402 is secured on the outer surface of the support 520. Or the intermediate connecting section 403 may be twisted at a further right angle. Then, even if the infrared beam sensor 511 rotates 180° or 360°, the intermediate connecting section 403 absorbs this deformation. Accordingly, this construction allows conservation of space for the lead wire and has excellent flexibility. The construction is simplified by leading the intermediate connecting section 403 from the side. However, it is possible to lead it out from the lower or upper side. Further, the intermediate connecting section 403 may be made spiral. Thereby it can fully absorb deformation even if the sensor rotating section rotates 2 or 3 times. Further, a signal line 405 for leading the signal from the photocoupler toward the outside may be made integral with the flexible substrate. Further, a thermistor for measuring temperature may be disposed and a signal line for guiding its temperature signal toward the outside may be connected to this flexible substrate. It is also possible to package the thermistor itself on the substrate.

[Eighth Embodiment]

The temperature distribution measuring device of the present invention may be applied to an audience rate measuring system. That is, an infrared beam is measured for a place where TV viewers normally sit. For example, by setting the temperature distribution measuring device of the present invention on the TV, an accurate audience rate, and relative positions thereof, may be measured readily with the small unit. When the TV is turned on, the temperature distribution of that place is measured and using this result, the number of people is determined as described above. The data concerning the number of people is transmitted toward the outside through a telephone line for example. At this time, because the data to be sent is only that of the number of people and not that of temperature distribution, the transmission amount thereof is reduced. Usage conditions may be accurately learned and the life of the device is prolonged by measuring the number of people only when the TV is turned on.

[Ninth Embodiment]

A silicon spherical lens, for example, is used for the infrared beam lens 512 of the present embodiment. It is a silicon polycrystalline substance and anti-reflection films are formed on both faces after grinding both convex spherical faces. Its cost is low and it is easy to use. Or, alternatively a chalcogen non-spherical lens may be used. The material is KRS5, Ge, GeSe and GeTe. Anti-reflection films are formed after direct pressing. Thereby, such advantages as an increase in the transmittivity of the lens, easy adaptation to high sensitivity, less aberration and less distortion in the thermal image, and excellent mass-producibility are brought about. The anti-reflection film is an evaporated or sputtered film of ZnS. Its thickness is lamda/4n (where $\lambda=10$ micron and n is a refractive index of the lens).

Incidentally, although a pyroelectric sensor has been used for the infrared beam detecting section, other infrared beam sensors such as a thermopile, for example, may be used, so long as they do not contradict the required operation and effect.

Further, although an example in which the temperature distribution measuring device is mounted at the center of the ceiling has been explained, the mounting position is not confined to such a place.

Still further, although the temperature distribution measuring range was set to be 360° in the aforementioned embodiments, it may be less than 360° if there is a range in which part thereof need not be measured depending on the mounting position, for example.

In addition, although the control means 8 and the signal processing have been arranged by means of software by using a CPU, the arrangement may be altered by using dedicated hardwares to perform the same function.

Although various chopper mechanisms have been explained in the aforementioned embodiments, other arrangements may be used so long as one can block the incident infrared beam.

As it is obvious from the description above, the present invention has an advantage in that spatial resolution and temperature resolution can be increased at low cost, since it comprises an infrared beam detecting means having a plurality of detecting sections for detecting infrared beams and a rotation driving means for rotating the infrared beam detecting means.

What is claimed is:

1. A temperature distribution measuring device, comprising:
    infrared beam detecting means including an infrared beam array sensor,
    a chopper for intermittently blocking infrared beams incident on the infrared beam array sensor, the chopper having an umbrella shape, and
    rotational driving means for independently rotating the infrared beam detecting means on a first rotational axis and the chopper on a second rotational axis, the first rotational axis and the second rotational axis substantially coinciding,
    wherein the infrared beam array sensor is disposed obliquely at an inclination angle $\theta_B$ to the first rotational axis.

2. The temperature distribution measuring device according to claim 1, wherein
    the inclination angle $\theta_B$ is expressed by $\theta_B >= 90 - \theta_{IV}$, where $\theta_{IV}$ is one-half of the measurable angle of view of the infrared beam detecting means, the total measurable angle of view of the infrared beam detecting means being $2 \times \theta_{IV}$.

3. The temperature distribution measuring device according to claim 1, wherein
    the infrared beam detecting means continuously rotates in a fixed direction.

4. The temperature distribution measuring device according to claim 1, wherein
    the rotational driving means is a brushless motor having a frequency generator pattern formed thereon, and a speed of rotation of the brushless motor is controlled by utilizing a current induced on the frequency generator pattern.

5. The temperature distribution measuring device according to claim 1, further including:

a positioning means for detecting the position of the chopper, the positioning means being provided in either the infrared beam detecting means alone or in both the infrared beam detecting means and the chopper cooperatively.

6. The temperature distribution measuring device according to claim 5, wherein a start time for sampling output signals of the infrared beam array sensor is controlled using a signal from the positioning means.

7. The temperature distribution measuring device according to claim 5, wherein sampling of output signals of the infrared beam array sensor is started by a signal from the positioning means, values of the output signals at fixed time intervals are sequentially added, and a measured temperature is obtained from the added values of the output signals.

8. The temperature distribution measuring device according to claim 5, wherein sampling of output signals of the infrared beam array sensor is started by a signal detected by the timing means and a measured temperature is obtained from a peak value of the sampled output signals.

9. The temperature distribution measuring device according to claim 1, further including:

a support for supporting the chopper and the infrared beam detecting means, and rotational positioning means for detecting a rotational position of the infrared beam array sensor, the rotational positioning means being provided on the support and the infrared beam detecting means.

10. The temperature distribution measuring device according to claim 1, further including:

a support for supporting the chopper and the infrared beam detecting means, and a substantially planar lead wire having a flexible substrate with a first end, a second end and an intermediate connecting section disposed therebetween, the first end being connected to the detecting means and the second end being connected to the support, wherein the first end and the second end are flat plate sections and the intermediate connecting section is relatively narrow compared to the size of the flat plate sections, and the lead wire is bent at the intermediate connecting section, whereby the lead wire can absorb deformation by means of the intermediate connecting section bending or twisting.

11. The temperature distribution measuring device according to claim 1, whereby a temperature distribution in a space section facing an audio visual medium can be measured.

12. The temperature distribution measuring device according to claim 11, wherein a number of people, and positions thereof, in the space section are determined based on the temperature distribution and wherein data concerning the number of people is transmitted as signals.

13. The temperature distribution measuring device according to claim 1, wherein the infrared beam detecting means further includes a lens section for converging infrared beams to the infrared beam array sensor.

14. The temperature distribution measuring device according to claim 13, wherein:

the lens section is a silicon spherical lens or a chalcogen aspherical lens.

15. The temperature distribution measuring device according to claim 1, wherein:

a rotational speed of the infrared beam detecting means differs from a rotational speed of the chopper.

16. The temperature distribution measuring device according to claim 1, wherein:

the infrared beam array sensor is a pyroelectric type.

\* \* \* \* \*